United States Patent [19]

Marzucco et al.

[11] Patent Number: 4,942,515

[45] Date of Patent: Jul. 17, 1990

[54] SERIAL COMMUNICATIONS CONTROLLER WITH FIFO REGISTER FOR STORING SUPPLEMENTAL DATA AND COUNTER FOR COUNTING NUMBER OF WORDS WITHIN EACH TRANSFERRED FRAME

[75] Inventors: Teresa Marzucco, Waltham, Mass.; John Korpusik, Hudson, N.H.; Patricia A. Martin, Westford, Mass.

[73] Assignee: Wang Laboratories, Inc., Lowell, Mass.

[21] Appl. No.: 846,337

[22] Filed: Mar. 31, 1986

[51] Int. Cl.[5] ..................... G06F 13/28; G06F 12/06; G06F 13/00

[52] U.S. Cl. ................................. 364/200; 364/238.3; 364/254.3; 364/254.5; 364/239.6; 364/232.8; 364/242 A; 364/251.1; 364/251.3

[58] Field of Search ... 364/200 MS File, 900 MS File; 370/60, 82, 100

[56] References Cited

U.S. PATENT DOCUMENTS

| | | | |
|---|---|---|---|
| 3,855,422 | 12/1974 | Cadiou et al. | 370/82 |
| 4,040,026 | 8/1977 | Sernelle | 364/200 |
| 4,133,030 | 1/1979 | Huettner et al. | 364/200 |
| 4,313,160 | 1/1982 | Kaufman et al. | 364/200 |
| 4,346,440 | 8/1982 | Kyu et al. | 364/200 |
| 4,507,760 | 3/1985 | Fraser | 364/134 |
| 4,536,872 | 8/1985 | Lahti | 370/82 |
| 4,538,224 | 8/1985 | Peterson | 364/200 |
| 4,542,457 | 9/1985 | Mortensen | 364/200 |
| 4,550,401 | 10/1985 | Spears | 370/60 |
| 4,672,543 | 6/1987 | Matsui et al. | 364/900 |
| 4,704,606 | 11/1987 | Hasley | 370/82 |

Primary Examiner—Archie E. Williams, Jr.
Assistant Examiner—Emily Y. Chan
Attorney, Agent, or Firm—Michael H. Shanahan

[57] ABSTRACT

A single chip serial communications controller, adapted for transfer of data to memory in a direct memory access interrupt, generates a status word for each frame of data. To allow for uninterrupted transfer of data to memory from frame to frame, the status words are stored in a FIFO along with word counts corresponding to the frames to allow for subsequent identification of the addresses to which the data frames are assigned. The FIFO is incremented at the end of each frame and decremented as each status word is read by a CPU.

5 Claims, 2 Drawing Sheets

SERIAL COMMUNICATIONS CONTROLLER WITH FIFO REGISTER FOR STORING SUPPLEMENTAL DATA AND COUNTER FOR COUNTING NUMBER OF WORDS WITHIN EACH TRANSFERRED FRAME

BACKGROUND

A typical data processing system to which the present invention is applied as illustrated in FIG. 1. A central processing unit 12 communicates with a main memory 14 through address, data and control buses 16, 18, and 20. Other peripherals such as a keyboard, a CRT display and a printer may also be coupled to the three buses. Although shown as separate, a single bus may be shared in a time multiplexing operation for the three functions. The CPU must often communicate with other systems and for that purpose an input/output controller 22 is provided. Data transferred to and from the I/O controller may be in serial format along a single bus 24, and one of the functions of the I/O controller is to convert between the serial data format and the parallel format used within the data processing systems whereby multiple bits are transferred in parallel as bytes.

Typically, large frames of multiple bytes are transmitted to the system and must be written into sequential locations in the memory 14. Conversely, large frames of data may be accessed from sequential memory locations and transmitted from the data processing system through the I/O controller 22. In either case, sequential addressing of the memory locations by the CPU is extremely time consuming and the CPU would significantly limit the bit rate at which information could be transmitted to or from the system. To overcome that problem, direct memory access (DMA) controllers are provided. When the memory is to be accessed in sequential memory locations in order to store or retrieve frames of multiple bytes, the CPU programs the DMA controller and then relinquishes the address, data and control buses to the controller. The controller then sequences through blocks of memory addresses for which it has been programmed, and the data is transferred directly to or from the addressed memory locations.

The CPU may program the DMA controller to designate the blocks of memory 14 available to the DMA controller for storage of data or the blocks of memory from which data must be retrieved. When data is received by or to be transmitted from the I/O controller 22, the I/O controller provides a DMA request to the DMA controller. The DMA controller then requests a CPU interrupt by means of a hold signal. The CPU then provides a hold acknowledge signal to the DMA controller to relinquish the buses to the controller. The buses may be relinquished through the complete transfer of a block of data or by means of a cycle stealing process in which, for example, single bytes are transferred during time - spaced cycles.

A serial communications controller for which the present invention was developed is the Z8530 sold by Zilog Inc. and described in the Zilog Z8030/Z8530 SCC Serial Communications Controller Technical Manual, January 1983. The Z8530 is capable of providing multifunction support for a large variety of serial communication protocols. For Synchronous Data Link Control/High Level Data Link Control (SDLC/HDLC) protocols, for example, the system can provide for automatic zero insertion and deletion, automatic flag insertion between messages, address field recognition, I-field residue handling and cyclic redundancy check (CRC) generation and detection.

The SDLC (Synchronous Data Link Control) message format is illustrated in FIG. 2. Two flag bytes F delineate each SDLC frame. The flag byte in SDLC is a hexidecimal 7E (two zeros separated by six ones). The flags serve as reference points when positioning the address byte A, control byte C and CRC bytes, and they initiate the transmission error check. A single flag byte such as flag 28 may separate two frames of data or individual flags 30 and 32 may terminate and initiate separate frames of data. The flags 30 and 32 may be separated by other flags. Any number of data bytes D may be provided in each frame.

For each frame of incoming data, a status word is generated by the Z8530 I/O controller. That status word may include an end of frame bit, a CRC/framing error bit, an overrun error from an I/O controller first-in/first-out (FIFO) register, a parity error bit, residue codes indicating the length of the I-field in an SDLC mode and an all sent bit for use in a synchronous mode. Once a frame of data has been transmitted through the I/O controller to the system, the status word must be read by the CPU. To that end, at the end of a frame the output of the I/O controller is locked while the CPU services an interrupt routine whereby the status is read, the DMA controller may be reprogrammed, and the I/O controller is reset. In the meantime, however, a subsequent frame of data may be transmitted to the I/O controller. The Z8530 SCC includes a FIFO to allow for continued receipt of data as the CPU services the interrupt routine. Where only a single flag is positioned between two frames and the transmission is at 64 kilobaud, the three level FIFO provided allows only 375 microseconds. That amount of time is insufficient for many CPUs to service the interrupt. To provide for additional time between frames, additional flags may be inserted; however, that requires a limitation imposed on the transmitting device by the receiving processor. Another approach would be to increase the size of the FIFO, but the size of the FIFO which would be required to serve slower CPUs would be uncertain and prohibitive.

SUMMARY OF THE INVENTION

The present invention relates to control circuitry in a data communication system for receiving sequential frames of incoming data words and transferring the data words to memory in a direct memory access. The words may be eight bit bytes or any other unit of information defined by the system. The control circuitry includes circuitry for generating supplemental data, such as the status word in SDLC protocol, to be transmitted to a CPU for each frame. Means is provided for counting the number of words in each frame and for storing the supplemental data and the associated word counts. With the supplemental data and word counts available to the CPU, subsequent frames of data can be immediately transferred to memory under DMA control without interruption. That is, a block or cycle stealing DMA transfer may continue into subsequent frames. The word count defines the length of each frame so that the CPU can subsequently note the blocks of memory to which each frame was assigned and note the corresponding status word.

In a preferred system, the supplemental data and word counts are stored in FIFOs. The FIFOs are incremented at the end of each frame and decremented as each supplemental word is read from the controller. Preferably, the control circuitry is a serial communications controller fabricated on a single chip.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout tne different views. The drawings are not necessarily to scale, emphasis instead being placed upon illustrating the principles of the invention.

DESCRIPTION OF A PREFERRED EMBODIMENT

Figure 1:
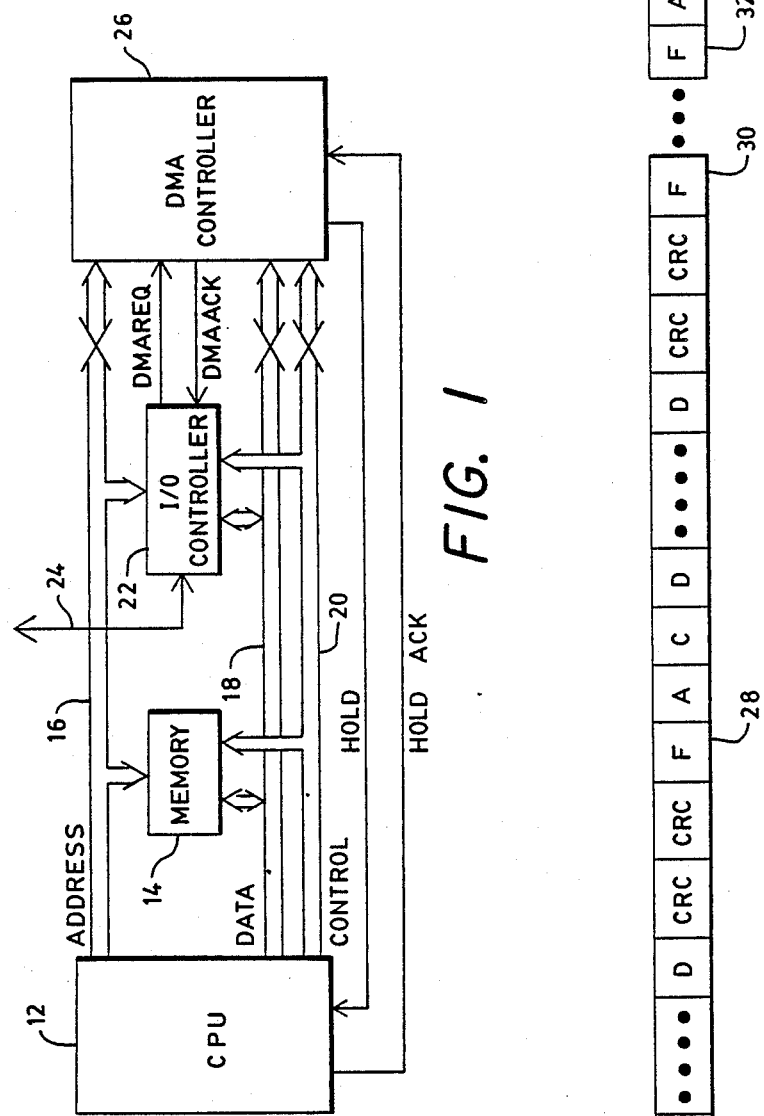
FIG. 1 is a block diagram of data processing system for which the present system was developed.
Figure 2:
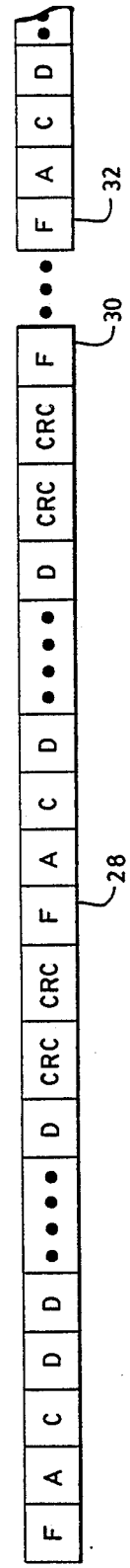
FIG. 2 is an illustration of the SDLC message format.
Figure 3:
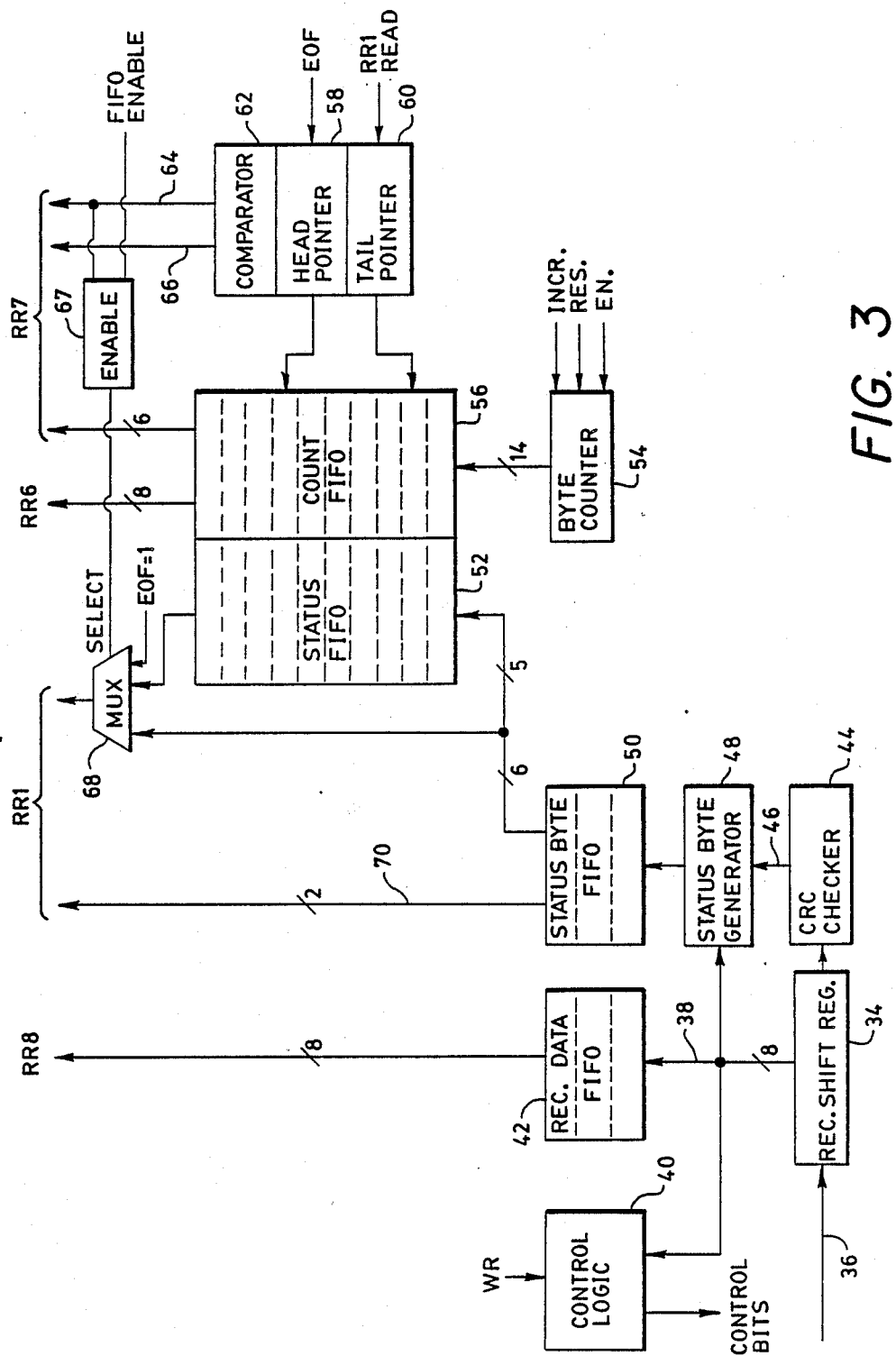
FIG. 3 is a block diagram illustrating modification of an I/O controller in accordance with the present invention.

A simplfied schematic of a portion of a Z8530 SCC used in receiving SDLC formatted data is illustrated to the left of FIG. 3. The serial data is directed to a receive shift register 34 from a line 36. The data bits shifted through the register are then read in parallel to lines 38. The control logic 40 determines when a flag is received and when that flag is followed by the address of the controller. Thereafter, data bytes are applied to the receive FIFO 42. The data from the shift register is also applied to a CRC checker 44 to generate a CRC error signal on line 46. A status byte generator 48 relies on that error bit and the data byte on line 38 to generate a status byte which corresponds to the data byte applied to FIFO 42. The status byte is applied to a parallel FIFO 50.

As data bytes are recieved, they are directed through the FIFO 42 and are available on a read register RR8 for transfer to memory under control of the DMA controller 26. Within the frame, the status byte from the FIFO 50 is ignored; it is only valid when the last data byte of a frame is received. In the Z8530, when the end of a frame is detected, the outputs of the data FIFO 42 and status byte FIFO 50 are locked. This gives the CPU 12 time to read the status byte of the just received frame and to program the DMA controller 26 for proper storage of the next frame. The CPU then resets the I/O controller for receipt of the next frame. The shift register 34 and FIFOs 42 and 50 only allowed for the receipt of three additional data bytes before the FIFOs became full when their outputs were locked. The time during which two bytes might be received was inadequate for processing of the CPU interrupt routine. As already noted, the problem could be overcome by having additional flag bytes inserted between all frames by the transmitter so that the bytes which would be lost by the FIFOs would not result in a loss of information. Alternatively, the FIFOs 42 and 50 could be lengthened substantially. As already noted, neither of those approaches was satisfactory.

In accordance with the present invention, the FIFOs 42 and 50 are not locked at the end of a frame. Rather, if additional frames are received prior to read-out of status bytes by the CPU, the status bytes are stored in a FIFO 52. Thus the status bytes would not be lost and could be read at a later time by the CPU. The mere storage of the status words is not sufficient, however, because the CPU would not then know the length of the frame which had been recieved. With the DMA controller 26 continuing to store the data bytes in sequential addresses of memory 14, there would be no means for identifying the address at which one frame ended and at which the next frame began. To overcome that problem, the bytes within each frame are counted by a counter 54 and a byte count is stored in FIFO 56 for each frame for which a status byte is stored in FIFO 52. Thus, once the CPU has time to read the status byte from the read register RR1, it would also be able to read the length of the corresponding frame from tne byte count in registers RR6 and RR7.

The byte counter 54 is enabled by a control bit from the control logic 40 when the system is placed in an SDLC/HDLC mode. When enabled, the byte counter is incremented with the detection of each data byte by the control logic 40 and is reset with the detection of each flag byte. To increment and decrement the FIFOs 52 and 56, the head pointer to the FIFOs 52 and 56 is incremented by an end-of-frame signal generated by the control logic and the tail pointer is incremented each time the read register RR1 is read. The two pointers are compared by a comparator 62 to provide an indication on line 64 as to whether data is available in the status FIFO and an indication on line 66 as to whether there has been a FIFO overflow.

The indication on line 64 is combined with a FIFO enable signal from the control logic 40 in enable logic 67 to select the input to a multiplexer 68. Where sufficient time is provided between frames of data to permit reading of the status byte without storage in the FIFO, the status byte can be read directly through the multiplexer 68 to read register RR1. However, once data as available in the FIFOs 52 and 56, the multiplexer 68 selects the data from the FIFO 52 as its input. The end of frame bit of the status byte is set at one whenever data is read from the FIFO. The ALL SENT bit and the parity bit need not be stored in SDLC communications and thus bypass the FIFO and multiplexer on line 70.

The FIFOs 52 and 56 are shown to have ten levels. In some systems, it may be certain that no more than ten frames would be received before a lull in incoming data. In that case, all status bytes and byte counts might simply be stored in the FIFOs until the lull as the data is transferred through register RR8 to the memory 14. However, if a sufficient lull is not assured, the CPU should read the status bytes and byte counts as the DMA controller transfers on a cycle stealing basis.

Because the status byte and byte count FIFOs need only store one byte each for each frame of incoming data, the FIFOs of only 10 levels provide a substantial buffer. The same amount of buffering by means of data FIFO 42 would require a much larger data FIFO because it must buffer on a byte basis rather than a frame basis.

Due to the multiplexer 68, the same register RR1 used for providing the status word in the Z8530 controller can be used in the modified communications controller. Further, the read registers R6 and R7 are unused in the Z8530 and are thus available for use in a modified controller which is pin compatible with the Z8530. Thus, the modified controller chip can be used as a pin compatible replacement for the Z8530 while providing the added capabilities of the present invention. By providing these added capabilities in the controller chip itself, one not only avoids the need for extra chips on the system board but is also able to conveniently make use of control signals available only within the chip itself.

While this invention has been particularly shown and described with references to a preferred embodiment thereof, it will be understood by those skilled in the art that vaious changes in form and details may be made therein without departing from the spirit and scope of the invention as defined by the appended claims. For example, the invention may be applied to other forms of data transfer such as the transfer of sectors of data with supplemental codes from storage such as disc storage.

We claim:

1. Input/output control circuitry for a data communication system for receiving sequential frames of incoming data words, each frame having an end, and for transferring the data words to memory which is separate from the control circuitry, the control circuitry comprising:

means for generating supplemental data to be read from the control circuitry, supplemental data being information which is different from but is associated with each frame of incoming data;

means for counting the number of words within each frame to provide a word count;

means comprising a first-in/first-out register (FIFO),- coupled to the means for generating and the means for counting, for storing the supplemental data and the associated word counts with continued transfer of sequential frames of data to said memory, such that the supplemental data and word counts are available to be read from the control circuitry after transfer of the frame with which the supplemental data is associated; and control logic means responsive to said supplemental data for incrementing the first-in/first-out register at the end of each frame and for decrementing the first-in/first-out register as each set of supplemental data and associated word count is read and processed by a central processing unit.

2. Control circuitry as claimed in claim 1 which is a serial communications controller fabricated on a single chip.

3. Control circuitry as claimed in claim 1 wherein the supplemental data includes a synchronous Data Link Control/High Level Data Link Control (SDLC/HDLC) protocol status word.

4. Control circuitry as claimed in claim 3 which is a serial communication controller fabricataed on a single chip.

5. Control circuitry as claimed in claim 1 wherein the supplemental data is data to be read by a central processing unit and further comprising means for converting serial data to parallel data for transfer as parallel bits in a direct memory access.

* * * * *